United States Patent [19]

Suzuki et al.

[11] Patent Number: 4,500,193

[45] Date of Patent: Feb. 19, 1985

[54] INDICATING APPARATUS FOR CAMERA

[75] Inventors: Ryoichi Suzuki, Kanagawa; Ryuji Tokuda, Tokyo, both of Japan

[73] Assignee: Canon Kabushiki Kaisha, Tokyo, Japan

[21] Appl. No.: 456,786

[22] Filed: Jan. 10, 1983

Related U.S. Application Data

[63] Continuation of Ser. No. 250,687, Apr. 3, 1981, abandoned.

[30] Foreign Application Priority Data

Apr. 7, 1980 [JP] Japan ................... 55-45958

[51] Int. Cl.³ .............................................. G03B 7/08
[52] U.S. Cl. ..................................... 354/471; 354/476
[58] Field of Search .................. 354/23 D, 26, 29, 30, 354/60 C, 289, 471, 476

[56] References Cited

U.S. PATENT DOCUMENTS

| | | | |
|---|---|---|---|
| 3,672,267 | 6/1972 | Harvey et al. ................ | 354/29 |
| 4,041,504 | 8/1977 | Iodvalkis et al. ............. | 354/60 L |
| 4,072,960 | 2/1978 | Meiyner ...................... | 354/60 L |
| 4,134,660 | 1/1979 | Sakuvadu et al. ............ | 354/289 |
| 4,209,244 | 6/1980 | Sahara et al. ................ | 354/60 L |
| 4,223,987 | 9/1980 | Shimizu et al. .............. | 354/289 |
| 4,258,990 | 3/1981 | Arisaka et al. .............. | 354/29 |
| 4,272,176 | 6/1981 | Maitami et al. ............. | 354/289 |
| 4,278,336 | 7/1981 | Ito et al. ...................... | 354/289 |

Primary Examiner—Russell E. Adams
Attorney, Agent, or Firm—Toren, McGeady and Stanger

[57] ABSTRACT

In the disclosed indicating apparatus, an alarm operates an indicator when a light measuring system measures abnormal lighting. A latch latches the alarm in response to a shutter release to indicate that the shutter is open. A switchover device changes the alarm signal in response to the end of an exposure. According to one embodiment of the invention, the indicator displays the alarm condition while the shutter is open. According to another embodiment of the invention, the indicator assumes a condition constituting a substate of the alarm condition.

10 Claims, 4 Drawing Figures

INDICATING APPARATUS FOR CAMERA

This is a continuation of application Ser. No. 250,687, filed Apr. 3, 1981, now abandoned.

BACKGROUND OF THE INVENTION

1. Field of the Invention

The present invention relates to a camera indicating apparatus, particularly for producing an alarm signal indicating abnormal brightness and, at the same time, for indicating that the shutter is open.

2. Description of the Prior Art

Of the various light measuring systems for a camera, the so-called auxiliary aperture light measuring system has an accuracy almost as great as that of the TTL light measuring system of a single lens reflex camera.

Such an auxiliary light measuring system utilizes an auxiliary opening member coupled to the principal opening member in front of the film surface, but arranged outside of the optical axis of the principal opening member. In such a system, the amount of light coming from the object through the auxiliary opening member is considered the equivalent of the light coming from the object through the principal opening member and incident upon the film surface. The auxiliary opening member is a member which maintains a predetermined opening (hereinafter called the pre-opened state) during the light measuring mode, is totally closed when the mode is changed to the exposure mode, and then is gradually opened until it is fully open, at which position it remains during exposure.

Abnormal brightness conditions can easily be indicated with such auxiliary aperture light mechanisms by using an indicating element which responds to the output of a light sensing element arranged behind the auxiliary opening member. It is also possible easily to indicate that the shutter is open by using a second indicating element that responds to the output of the aforementioned light sensing element during an exposure control operation. This second indicating element can then be extinguished by a shutter closing signal that occurs when the shutter closes.

However, it has been impossible to indicate such an alarm signal and an open-shutter indicating signal with one indicating element when using such an auxiliary aperture light measuring system.

As mentioned, the auxiliary opening member arranged ahead of the light sensing element assumes a totally open state after the camera has changed from the light measuring mode into the exposure mode. This allows more light to strike the light sensing element than in the pre-opened state so that the low brightness alarm signal produced during the light measuring mode, and indicating that the object brightness is low, disappears the moment the mode is changed into the exposure mode. As a result, it is not possible to indicate termination of the shutter opening with a single indicating element.

Moreover, if the object brightness is high, the aforementioned auxiliary aperture system temporarily assumes the totally closed state when the mode is changed from the light measuring mode into the exposure mode. This interrupts the incidence of light on the light measuring element. Hence, the brightness alarm signal produced in the light measuring mode and indicating that the object brightness is high, disappears in a moment. As a result, erroneous alarm information is indicated at the time of the mode changeover. Thus, in both of these cases, it has been impossible to indicate the aforementioned two signals by means of only a single indicating element.

Further, in case, on the other hand, the object brightness is high, the above-mentioned auxiliary aperture means temporarily assumes the totally closed state when the mode is changed over out of the light measuring mode into the exposure mode, so as to interrupt the incidence of the light upon the light measuring element, whereby the high brightness alarm signal produced in the light measuring mode and indicating that the object brightness is high disappears in a moment, with the result that an erroneous alarm information is indicated at the time point of the mode change over. Thus, in both of the above two cases it has been impossible to indicate the above-mentioned two signals by means of only one indicating element.

SUMMARY OF THE INVENTION

An object of the present invention is to offer an indicating apparatus for the camera with the auxiliary aperture light measuring system, by means of which apparatus both of the alarm signal and the opened shutter indicating signal can be indicated by means of only one indicating element.

Another object of the present invention is to offer an indicating apparatus by means of which, beside the above mentioned object, the alarm signal can already be told from the opened shutter indicating signal.

Further other objects of the present invention will be obvious from the explanations to be made below in detail.

DESCRIPTION OF THE PREFERRED EMBODIMENTS

Figure 1A:
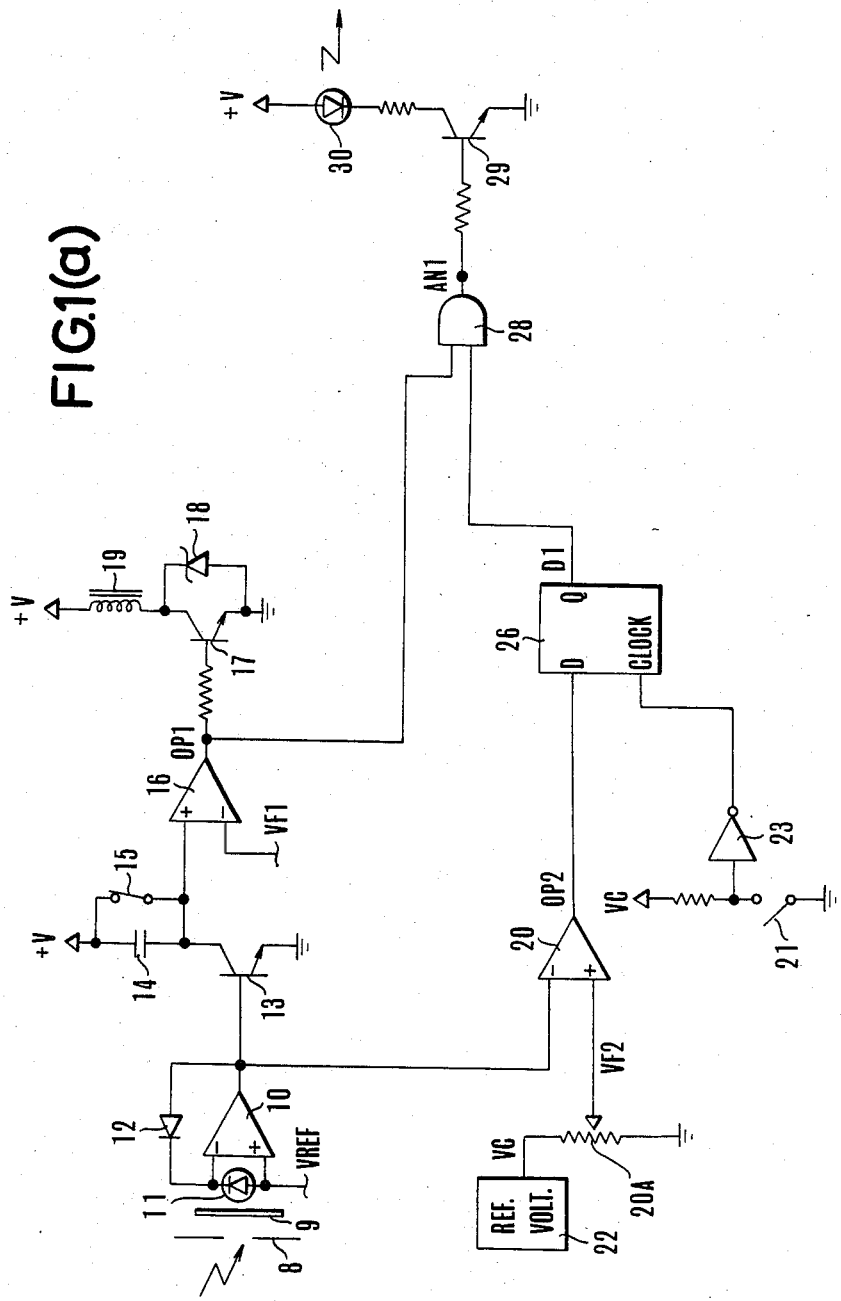
FIG. 1(a) shows the electrical circuit of an embodiment of the present invention.

FIG. 1(a) shows an electrical circuit of a camera using the present invention. The circuit includes an auxiliary aperture member 8, a variable ND filter 9 for entering ASA sensitivity information, an operational amplifier 10 (hereinafter called an OP amplifier) constituting an SPC head amplifier, a photoelectromotive element (hereinafter called an SPC) connected between the both inputs of an OP amplifier, a logarithmically compressing diode 12 inserted in the negative feed back circuit of the SPC, a prolonging npn transistor 13 connected to the output of the OP amplifier, a time determined condenser or capacitor 14 connected to the collector and a count start switch 15 connected parallel to the condenser. The switch is opened in operational engagement with the shutter release and closed in operational engagement with the shutter charge or cocking. An operational amplifier 16 forms a comparator whose non-inverting input is connected to the collector of the prolonging transistor 13 and whose inverting input receives a standard voltage VF1 of a predetermined level from the positive power source voltage. A switching transistor 16, whose base is connected to the output of the operational amplifier 10 through a resistance, has its collector connected to a solenoid 19 for keeping the shutter open. A Zener diode 18 serves for absorbing the counter electromotive force of the solenoid 19. An operational amplifier 20 forms a comparator, whose inverting input is connected to the output of the operational amplifier 10 and whose noninverting input receives a voltage VF2. The voltage VF2 is a constant output voltage Vc from a constant voltage circuit 22 divided by a potentiometer 20A. Member 21 is a switch to be closed along with the shutter release operation and element 23 is an inverting circuit. A latch circuit 26 is composed of a D type flip-flop, to whose D input the output of the operational amplifier 20 is applied and to whose CLOCK input the output of the above-mentioned inverting circuit 23 is applied. The latch circuit 26 is arranged so that while the level of the CLOCK input is high it latches the input signal produced when the level of the CLOCK input has inverted from low to high, while the input signal appears at the output while the level of the CLOCK is low. An AND gate 28 has one input connected to the output of the abovementioned operational amplifier 16 and another input connected to the output D1 of the latch circuit 26. A switching transistor 29 has its base connected to the output of the AND gate 28 through a resistance and to its collector to the LED 30 for displaying an alarm and at the same time a signal while the shutter is opened. Hereinafter, the output of the operational amplifier 16 is called OP1, the output of the operational amplifier 20 OP20, the output of the latch circuit 26 D1, and the output of the AND gate 28 AN1.

Figure 1B:
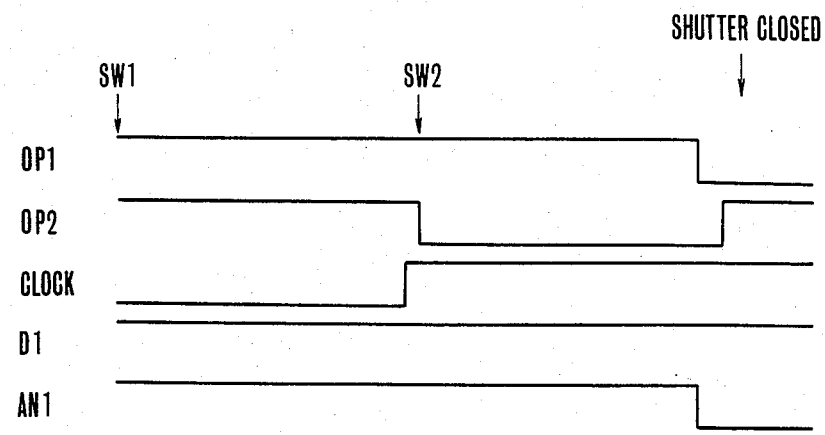
FIG. 1(b) shows the wave forms in the important parts in the circuit shown in FIG. 1(a).

The operation of this embodiment will be best understood from the timing chart shown in FIG. 1(b). The explanation starts with an under-exposure alarm.

When the power source switch SW1 not shown in the drawing is closed the level of the output OP1 of the operational amplifier 16 becomes high because the count start switch 15 has been closed, while the level of the output OP2 of the operational amplifier 20 becomes high because at this time the object brightness is so low that an under-exposure alarm is issued. Thus, at this time the level of the output D1 of the latch circuit 26 is high, while the level of the output AN1 of the AND gate 28 is also high so that the switching transistor 29 is brought into the closed state, i.e., rendered conductive, thereby lighting the LED30 so as to display the underexposure. The LED is arranged for example, in the view finder of the camera. Further, because at this time, the level of the output OP1 of the operational amplifier 16 is high, the switching transistor 17 is brought into the closed state, i.e., rendered conductive, so as to supply current to the solenoid 19. When the shutter release operation is carried out and the switch 21 is closed, the level of the output of the inverting circuit 23 goes high, while the level of the D input of the latch circuit 26 is high, so that the output D1 is latched at the high level. On the other hand along with the shutter release operation, the auxiliary aperture member 8 is once closed out of the pre-opened state and then totally opened so that depending upon the brightness of the object, the level of the output of the operational amplifier 20 is inverted low. Because hereby the output D1 of the above-mentioned latch circuit 26 is latched at the high level as is shown in FIG. 1(b), the level of the output AN1 of the AND gate 28 is also high so that LED30 lights in order to indicate that the shutter is in the opened state.

The shutter release operation results in opening the count start switch 15 so the time constant condenser 14 is charged with the prolonged current of the transistor 13 until the charge level reaches a predetermined value, at which the level of the output OP1 of the operational amplifier 16 is inverted to low. Thus, the switching transistor 17 is brought into the opened state, interrupting the current supply to the solenoid 19 so that the shutter closing operation is started by means of this shutter closing signal. When the output OP1 of the operational amplifier 16 is inverter to low, i.e., to L, the level of the output AN1 of the AND gate 28 is also inverted to the L level, putting out LED so as to indicate that the shutter is closed.

The above explanation relates to the case the object brightness is so low that the under-exposure alarm signal appears at the output of the operational amplifier 20. When the system operates as follows, if the object brightness is high while the level of the output of the operational amplifier 20 remains low, when along with the shutter release operation the level of the CLOCK input of the latch circuit 26 is inverted to high the lo level of D input is latched so that the level of the output D1 is kept low. If the level of the output OP2 of the operational amplifier 20 becomes high when, as explained above, the auxiliary aperture 8 is once closed out of the pre-opened state after the shutter release operation, the level of the output D1 of the latch circuit 26 remains low, while the level of the output AN1 of the AND gate 28 also remains low so that there is no danger that LED30 would be lit by mistake.

Hereby in case of the above-embodiment not only the under-exposure alarm but also the signal for indicating that the shutter is opened is indicated by means of a continuous lighting, so that it is hard to distinguish the one from the other. The second embodiment shown in FIG. 2 is the improvement of the above, whereby the under-exposure alarm is carried out by means of the continuous lighting, while the signal for indicating that the shutter is opened is carried out by a flickering light so that it is easy to distinguish the one from the other.

Below, the operation of the second embodiment will be explained. Hereby, the embodiment is almost similar to the first embodiment and the elements having the same figures as those in FIG. 1 are the same members, so that their explanations are here omitted.

Figure 2:
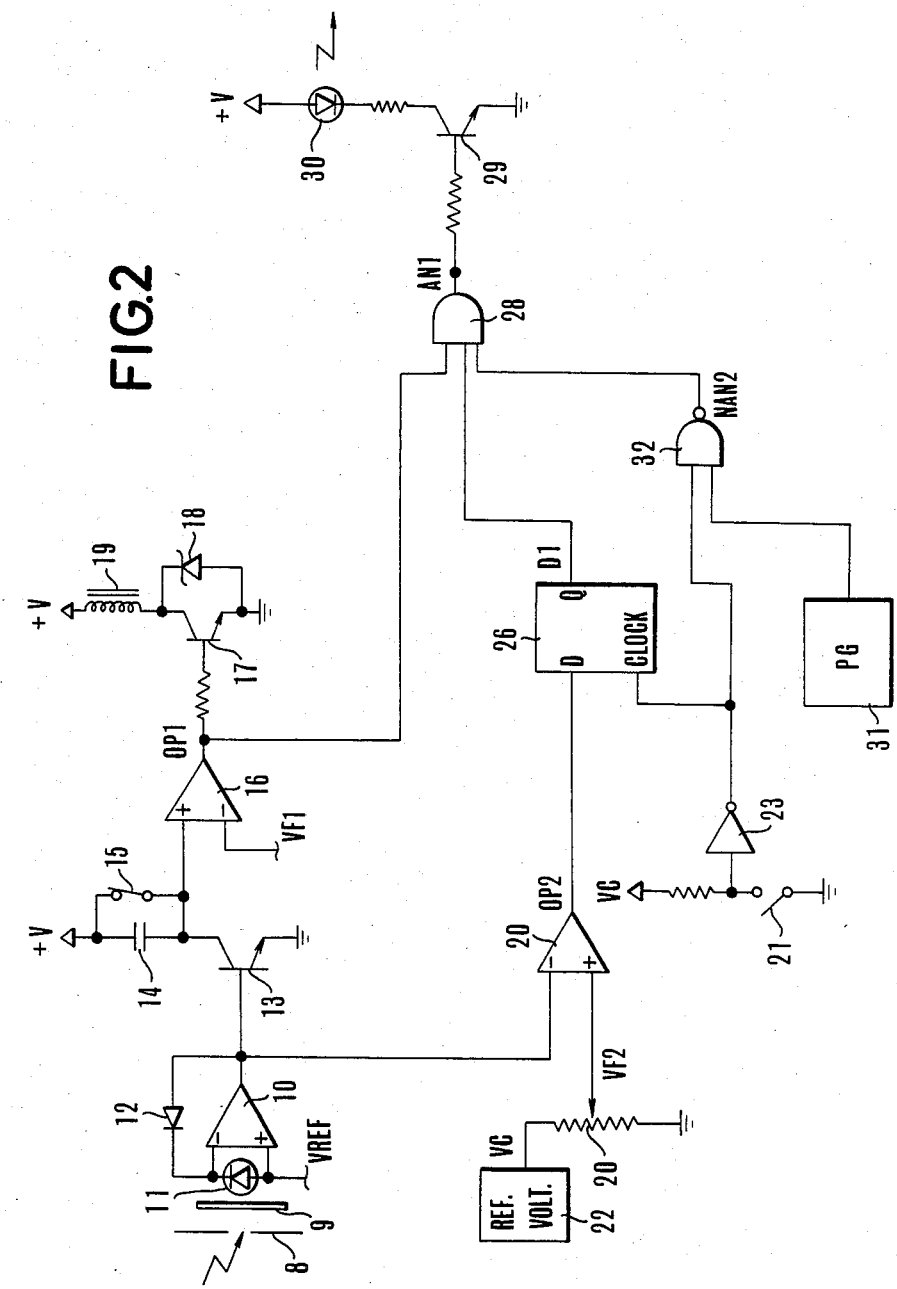
FIG. 2 shows the electrical circuit of another embodiment of the present invention.

In FIG. 2, a pulse generator 31 produces pulses with a frequency of several Hz and a NAND gate 32 has one input connected to the output of the above-mentioned inversing circuit 23 and whose other input is connected to the output of the pulse generator 31. Further, the output of the NAND gate 32 is connected to the third input of the AND gate 28.

Figure 3:
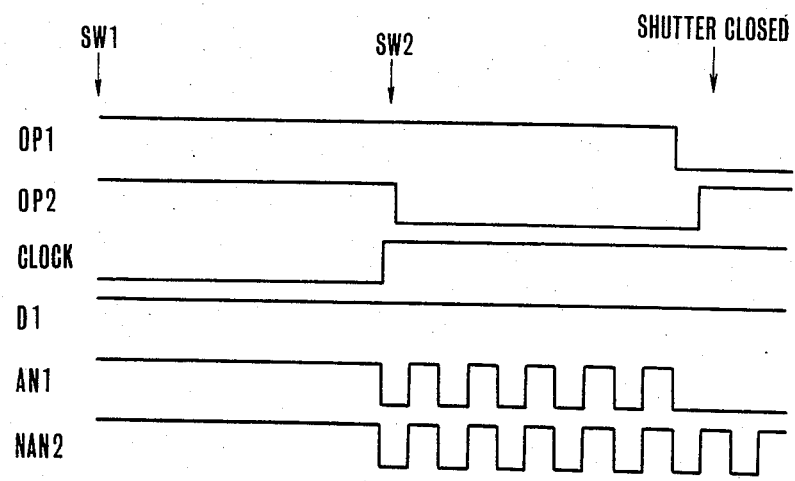
FIG. 3 shows the wave forms in the important parts in the circuit shown in FIG. 2.

The operation of the second embodiment, when the object brightness is so low that the under-exposure alarm signal is produced, will be best understood from the timing chart shown in FIG. 3 of the second embodiment. Because the level of the output of the inverting circuit 23 is low before the shutter release operation, the level of the output NAN2 of the NAND gate 32 becomes high, while the level of the output AN1 of the AND gate 28 is also high so that LED30 lights, indicating the under-exposure state. When the switch 21 is closed along with the shutter release operation the switch 21 is so as to inverted the level of the output of the inverting circuit 23 to high, a series of pulses produced in the pulse generator 31 is delivered from the output NAN2 of the NAND gate 32. Thus, from the output of the AND gate AN1 a series of pulses is delivered in such a manner that the switching transistor 29 is brought in the closed and the opened state, so the LED flickers to indicate that the shutter is opened. When on the other hand, the current supply to the solenoid 19 is interrupted after the lapse of a certain determined exposure time, so as to carry out the shutter closing operation, the level of the output AN1 of the AND gate 28 is inverted to low, whereby LED30 is put out.

As so far explained in detail in accordance with the embodiments, in accordance with the present invention the under-exposure signal and the signal for indicating that the shutter is opened can be carried out by means of one indicating device apparatus in spite of the auxiliary aperture light measuring system so that the manufacturing cost of the indicating apparatus can be made low.

What is claimed is:

1. A camera comprising:
   an auxiliary aperture for opening partially to a pre-open condition during a measuring mode, for completely closing at the start of an exposure mode and then for opening fully during an exposure;
   an auxiliary aperture light measuring system having a light sensing element for measuring the light coming from the object through the auxiliary aperture;
   an indicating signal producing element for producing an indicating in response to the output of the light sensing element; and
   an indicating element for assuming a first indicating state in response to the indicating signal;
   latch means for latching the indicating signal in response to a shutter release operation so as to maintain the output of the indicating element regardless of changes in light measured by said auxiliary light measuring system when said auxiliary aperture closes completely at the start of the exposure mode and then opens during an exposure; and
   first means for bringing the indicating element into another indicating state in response to a shutter closing operation.

2. A camera in accordance with claim 1, further comprising:
   second means for changing the first indicating state of the indicating element from one condition before to another condition after the shutter release operation.

3. A camera in accordance with claim 2, wherein the second means includes:
   means for switching the indicating element between a continuous lighting condition and a flickering condition.

4. A camera in accordance with claim 3, wherein the switching means includes a pulse generator and a control circuit responsive to the shutter release operation for controlling the output of the indicating means in response to the pulse generator after the initiation of the shutter release operation.

5. A camera in accordance with claim 1, wherein the latch means includes a flip-flop circuit responsive to the shutter release operation.

6. A camera comprising:
   an auxiliary aperture for opening partially to a pre-open condition during a measuring mode, for completely closing at a start of an exposure mode and then for gradually opening to a full open position during an exposure;
   a light sensing element for measuring the light coming from the object through the auxiliary aperture;
   alarm signal producing means for producing a low brightness alarm signal when the light coming from the object through the auxiliary aperture is low; and
   signal indicating means responsive to the alarm signal;
   latch means for latching the low brightness alarm signal in response to an exposure initiation operation so as to maintain the output of the signal indicating means regardless of changes in light measured by said auxiliary light measuring system when said auxiliary aperture closes completely at the start of the exposure mode and then opens during an exposure; and
   a means connected to the indicating means so as to change the output of the indicating means in response to the termination of an exposure.

7. A camera comprising:
   an auxiliary aperture for opening partially to a pre-open condition during a measuring mode, for completely closing at a start of an exposure mode and then for opening fully during an exposure;
   an auxiliary aperture light measuring system having a light sensing element for measuring the light coming from an object through the auxiliary aperture;
   an alarm signal producing element for producing an alarm signal in response to the output of the light sensing element;
   an indicating element for assuming a first indicating state in response to the alarm signal;
   latch means for latching the output of the indicating element after production of the alarm signal so as to maintain the output of the indicating element regardless of changes in light measured by said auxiliary light measuring system when said auxiliary aperture closes completely at the start of the exposure mode and then opens during an exposure; and
   means for bringing the indicating element into another indicating state in response to a shutter closing operation.

8. A camera comprising:
   an auxiliary aperture for opening partially to a pre-open condition during a measuring mode, for completely closing at the start of an exposure mode and for opening fully during an exposure;
   a light sensing element for measuring the light coming from an object through the auxiliary aperture;
   alarm signal producing means for producing an alarm signal in accordance with the output of the light sensing element;
   signal indicating means responsive to the alarm signal;
   latch means for latching the alarm signal in response to a shutter release operation so as to maintain the output of the indicating element regardless of changes in light measured by said auxiliary light measuring system when said auxiliary aperture closes completely at the start of the exposure mode and then opens during an exposure; and
   means for bringing the indicating element into another indicating state in response to a shutter closing operation.

9. A camera comprising:
   an auxiliary aperture for opening partially to a pre-open condition during a measuring mode, for completely closing at the start of an exposure mode and for opening fully during an exposure;

a light sensing element for measuring the light coming from an object through the auxiliary aperture;

alarm signal producing means for producing a low brightness alarm signal in accordance with the output of the light sensing element, and signal indicating means responsive to the alarm signal;

latch means for latching the alarm signal in response to a shutter release operation so as to maintain the output of the signal indicating means regardless of changes in light measured by said auxiliary light measuring system when said auxiliary aperture closes completely at the start of the exposure mode and then opens during an exposure; and means for bringing the indicating element into another indicating state in reponse to a shutter closing operation.

10. A camera, comprising:

an auxiliary aperture for opening partially to a preopen condition during a measuring mode, for closing at the start of an exposure mode and for opening during an exposure;

a light sensing element for measuring the light coming from an object through the auxiliary aperture;

alarm signal producing means for producing an alarm signal in accordance with the output of the light sensing element;

signal indicating means responsive to the alarm signal;

latch means for latching the alarm signal in response to a shutter release operation so as to maintain the output of the signal indicating means regardless of changes in light measured by said auxiliary light measuring system when said auxiliary aperture closes completely at the start of the exposure mode and then opens during an exposure; and means for bringing the indicating element into another indicating state in response to a shutter closing operation.

* * * * *